(12) United States Patent
Platusich

(10) Patent No.: US 10,627,036 B2
(45) Date of Patent: Apr. 21, 2020

(54) PRESSURE AND HEADLOSS MAINTAINING VALVE SYSTEM FOR CLEAN AND DIRTY WATER SYSTEMS

(71) Applicant: Red Valve Company, Inc., Carnegie, PA (US)

(72) Inventor: Bruce M. Platusich, Lewisburg, PA (US)

(73) Assignee: Red Valve Company, Inc., Pittsburgh, PA (US)

( * ) Notice: Subject to any disclaimer, the term of this patent is extended or adjusted under 35 U.S.C. 154(b) by 201 days.

(21) Appl. No.: 15/696,517

(22) Filed: Sep. 6, 2017

(65) Prior Publication Data

US 2018/0066785 A1 Mar. 8, 2018

Related U.S. Application Data

(60) Provisional application No. 62/383,865, filed on Sep. 6, 2016.

(51) Int. Cl.
| | | |
|---|---|---|
| *F16L 55/053* | (2006.01) | |
| *F15B 1/08* | (2006.01) | |
| *F15B 11/10* | (2006.01) | |

(52) U.S. Cl.
CPC ............. *F16L 55/053* (2013.01); *F15B 1/08* (2013.01); *F15B 11/10* (2013.01); *F15B 2201/205* (2013.01); *F15B 2201/411* (2013.01); *F15B 2201/4155* (2013.01); *F15B 2201/51* (2013.01); *F15B 2211/212* (2013.01); *F15B 2211/27* (2013.01); *F15B 2211/7053* (2013.01)

(58) Field of Classification Search
CPC ........... F16L 55/053; F15B 1/00; F15B 11/10; F15B 1/08; F15B 2201/205; F15B 2211/7053; F15B 2211/212; F15B 2201/51; F15B 2211/27; F15B 2201/4155; F15B 2201/411
USPC .................................. 251/22, 26, 31, 57, 62
See application file for complete search history.

(56) References Cited

U.S. PATENT DOCUMENTS

| | | | | |
|---|---|---|---|---|
| 3,177,894 | A * | 4/1965 | Camp .................... | F16K 15/181 137/514 |
| 3,942,551 | A * | 3/1976 | Schuller .................. | F16K 15/03 137/514 |
| 4,681,136 | A * | 7/1987 | Sequeira ................. | F16K 47/00 137/494 |
| 4,747,576 | A * | 5/1988 | Saito ....................... | F16K 1/523 251/25 |
| 4,800,922 | A * | 1/1989 | Bratland ................. | F15B 21/12 137/624.14 |
| 7,108,006 | B2 * | 9/2006 | Armstrong .......... | E21B 33/0355 137/14 |

(Continued)

*Primary Examiner* — Marina A Tietjen
(74) *Attorney, Agent, or Firm* — The Webb Law Firm

(57) ABSTRACT

A valve system includes: a valve; a hydraulic cylinder attached to at least a portion of the valve; and at least a first accumulator in fluid communication with the hydraulic cylinder. The first accumulator includes: (i) a first end having a fluid inlet and a fluid outlet; (ii) a second end having a gas inlet; and (iii) a body positioned between the first end and the second end and which includes a fluid chamber and a gas chamber separated by a flexible separating member. The hydraulic cylinder is configured to close the valve in response to pressure provided by fluid distributed from the first accumulator.

16 Claims, 2 Drawing Sheets

(56) References Cited

U.S. PATENT DOCUMENTS

| | | | | |
|---|---|---|---|---|
| 8,955,595 B2* | 2/2015 | Emecheta | ........... | E21B 33/0355 |
| | | | | 166/338 |
| 9,404,335 B2* | 8/2016 | Hallundbæk et al. | ....................... | |
| | | | | E21B 33/1243 |
| 2015/0114660 A1* | 4/2015 | Kotrla | .................... | E21B 34/16 |
| | | | | 166/363 |

* cited by examiner

PRESSURE AND HEADLOSS MAINTAINING VALVE SYSTEM FOR CLEAN AND DIRTY WATER SYSTEMS

CROSS REFERENCE TO RELATED APPLICATION

This application claims the benefit of U.S. Provisional Application No. 62/383,865, filed Sep. 6, 2016, which is incorporated herein by reference in its entirety.

BACKGROUND OF THE INVENTION

Field of the Invention

The present invention is directed to valves for water systems, and, in particular, to valve systems for maintaining pressure and headloss in pipelines.

Description of Related Art

Water systems generally require valves that are capable of maintaining a pressure in the pipelines. This is typically achieved by using a pressure sensor linked to a control valve, or by using the internal fluid pressure in the pipeline to enter a series of pressure balanced diaphragms within the valve. While these approaches are able to maintain pressure in the pipelines, they have various drawbacks. For instance, the control valve linked to the pressure sensor requires an external power source to actuate the valve. Further, the use of internal fluid pressure to directly and intimately effect operation will cause the system to become inoperable if the liquid is dirty or creates deposits that clog the passageways and diaphragms. Springs could also be used; however, springs significantly increase the pressure for operating the valve as the springs become compressed and exert more force. Thus, it is desirable to provide a valve for maintaining pressure and headloss in a pipeline that does not have the drawbacks associated with known devices and methods.

SUMMARY OF THE INVENTION

In certain embodiments, the present invention is directed to a valve system comprising: a valve; a hydraulic cylinder attached to at least a portion of the valve; and at least a first accumulator in fluid communication with the hydraulic cylinder. The first accumulator includes: (i) a first end comprising a fluid inlet and a fluid outlet; (ii) a second end comprising a gas inlet; and (iii) a body positioned between the first end and the second end, and which comprises a fluid chamber and a gas chamber separated by a flexible separating member. The hydraulic cylinder is configured to close the valve in response to pressure provided by fluid distributed from the first accumulator.

In some embodiments, the hydraulic cylinder comprises a barrel having a piston and a piston rod in which the piston rod is associated with a closure member of the valve. Further, the piston rod of the hydraulic cylinder can be attached to the closure member of the valve.

In some embodiments, the valve system of the present invention further includes a second accumulator in fluid communication with the hydraulic cylinder. The second accumulator can comprise: (i) a first end comprising a fluid inlet and a fluid outlet; (ii) a second end comprising a gas inlet; and (iii) a body positioned between the first end and the second end, and which comprises a fluid chamber and a gas chamber separated by a flexible separating member, in which the second accumulator is configured to increase the closing speed of the valve. In such embodiments, the first accumulator can be in fluid communication with a first end of the hydraulic cylinder where a piston is located and the second accumulator can be in fluid communication with a second end of the hydraulic cylinder that is opposite the first end of the hydraulic cylinder.

Moreover, the valve system can further include a fluid source attached to the fluid inlet of the first accumulator, a gas source attached to the gas inlet of the first accumulator, and/or at least one of an adjustable flow control for controlling the flow of fluid to and from the accumulator, a fluid gauge, and a gas gauge. The valve can also be a pinch valve.

In certain embodiments, the present invention is also directed to a method for maintaining pressure and headloss in a pipeline comprising: distributing fluid into a fluid chamber of a first accumulator; distributing gas into a gas chamber of the first accumulator that is separated from the liquid chamber by a flexible separating member; transporting the fluid from the fluid chamber of the first accumulator to a hydraulic cylinder that is attached to at least a portion of a valve of the pipeline; and closing the valve by movement of the hydraulic cylinder in a first direction in response to a pressure provided by the fluid from the fluid chamber of the first accumulator. In some embodiments, the method can further include a step of opening the valve by movement of the hydraulic cylinder in a second direction opposite the first direction in response to an opening of the valve in the pipeline from pipeline fluid.

The method can also include any of the features previously described with respect to the valve system of the present invention. Further, when a second accumulator is used, the method can further include distributing fluid into a fluid chamber of the second accumulator and transporting the fluid from the fluid chamber of the second accumulator to the hydraulic cylinder.

The present invention is also directed to the following clauses.

Clause 1: A valve system comprising:
a valve;
a hydraulic cylinder attached to at least a portion of the valve; and
at least a first accumulator in fluid communication with the hydraulic cylinder, said first accumulator comprising: (i) a first end comprising a fluid inlet and a fluid outlet; (ii) a second end comprising a gas inlet; and (iii) a body positioned between the first end and the second end and which comprises a fluid chamber and a gas chamber separated by a flexible separating member,
wherein the hydraulic cylinder is configured to close the valve in response to pressure provided by fluid distributed from the first accumulator.

Clause 2: The valve system according to clause 1, wherein the hydraulic cylinder comprises a barrel having a piston and a piston rod, and wherein the piston rod is associated with a closure member of the valve.

Clause 3: The valve system according to clause 2, wherein the piston rod of the hydraulic cylinder is attached to the closure member of the valve.

Clause 4: The valve system according to any of clauses 1 to 3, further comprising a second accumulator in fluid communication with the hydraulic cylinder.

Clause 5: The valve system according to clause 4, wherein the second accumulator comprises: (i) a first end comprising a fluid inlet and a fluid outlet; (ii) a second end comprising a gas inlet; and (iii) a body positioned between the first end and the second end and which comprises a fluid chamber and a gas chamber separated by a flexible separating member, wherein the second accumulator is configured to increase a closing speed of the valve.

Clause 6: The valve system according to clauses 4 or 5, wherein the second accumulator is in fluid communication with a first end of the hydraulic cylinder where a piston is located and the second accumulator is in fluid communication with a second end of the hydraulic cylinder that is opposite the first end of the hydraulic cylinder.

Clause 7: The valve system according to any of clauses 1 to 6, further comprising a fluid source attached to the fluid inlet of the first accumulator.

Clause 8: The valve system according to any of clauses 1 to 7, further comprising a gas source attached to the gas inlet of the first accumulator.

Clause 9: The valve system according to any of clauses 1 to 8, further comprising at least one of an adjustable flow control for controlling flow of fluid to and from the accumulator, a fluid gauge, and a gas gauge.

Clause 10: The valve system according to any of clauses 1 to 9, wherein the valve is a pinch valve.

Clause 11: A method for maintaining pressure and headloss in a pipeline comprising:
distributing fluid into a fluid chamber of a first accumulator;
distributing gas into a gas chamber of the first accumulator that is separated from the fluid chamber by a flexible separating member;
transporting the fluid from the fluid chamber of the first accumulator to a hydraulic cylinder that is attached to at least a portion of a valve of the pipeline; and
closing the valve by movement of the hydraulic cylinder in a first direction in response to a pressure provided by the fluid from the fluid chamber of the first accumulator.

Clause 12: The method according to clause 11, further comprising opening the valve by movement of the hydraulic cylinder in a second direction opposite the first direction in response to an opening of the valve in the pipeline from pipeline fluid.

Clause 13: The method according to clauses 11 or 12, wherein the hydraulic cylinder comprises a barrel having a piston and a piston rod, and wherein the piston rod is associated with a closure member of the valve.

Clause 14: The method according to any of clauses 11 to 13, wherein the piston rod of the hydraulic cylinder is attached to the closure member of the valve.

Clause 15: The method according to any of clauses 11 to 14, further comprising a second accumulator in fluid communication with the hydraulic cylinder.

Clause 16: The method according to clause 15, wherein the second accumulator comprises: (i) a first end comprising a fluid inlet and a fluid outlet; (ii) a second end comprising a gas inlet; and (iii) a body positioned between the first end and the second end and which comprises a fluid chamber and a gas chamber separated by a flexible separating member, wherein the second accumulator is configured to increase a closing speed of the valve.

Clause 17: The method according to clauses 15 or 16, wherein the first accumulator is in fluid communication with a first end of the hydraulic cylinder where a piston is located and the second accumulator is in fluid communication with a second end of the hydraulic cylinder that is opposite the first end of the hydraulic cylinder.

Clause 18: The method according to any of clauses 15 to 17, further comprising distributing fluid into the fluid chamber of the second accumulator, distributing gas into the gas chamber of the second accumulator, and transporting the fluid from the fluid chamber of the second accumulator to the hydraulic cylinder.

DESCRIPTION OF THE INVENTION

Figure 1:
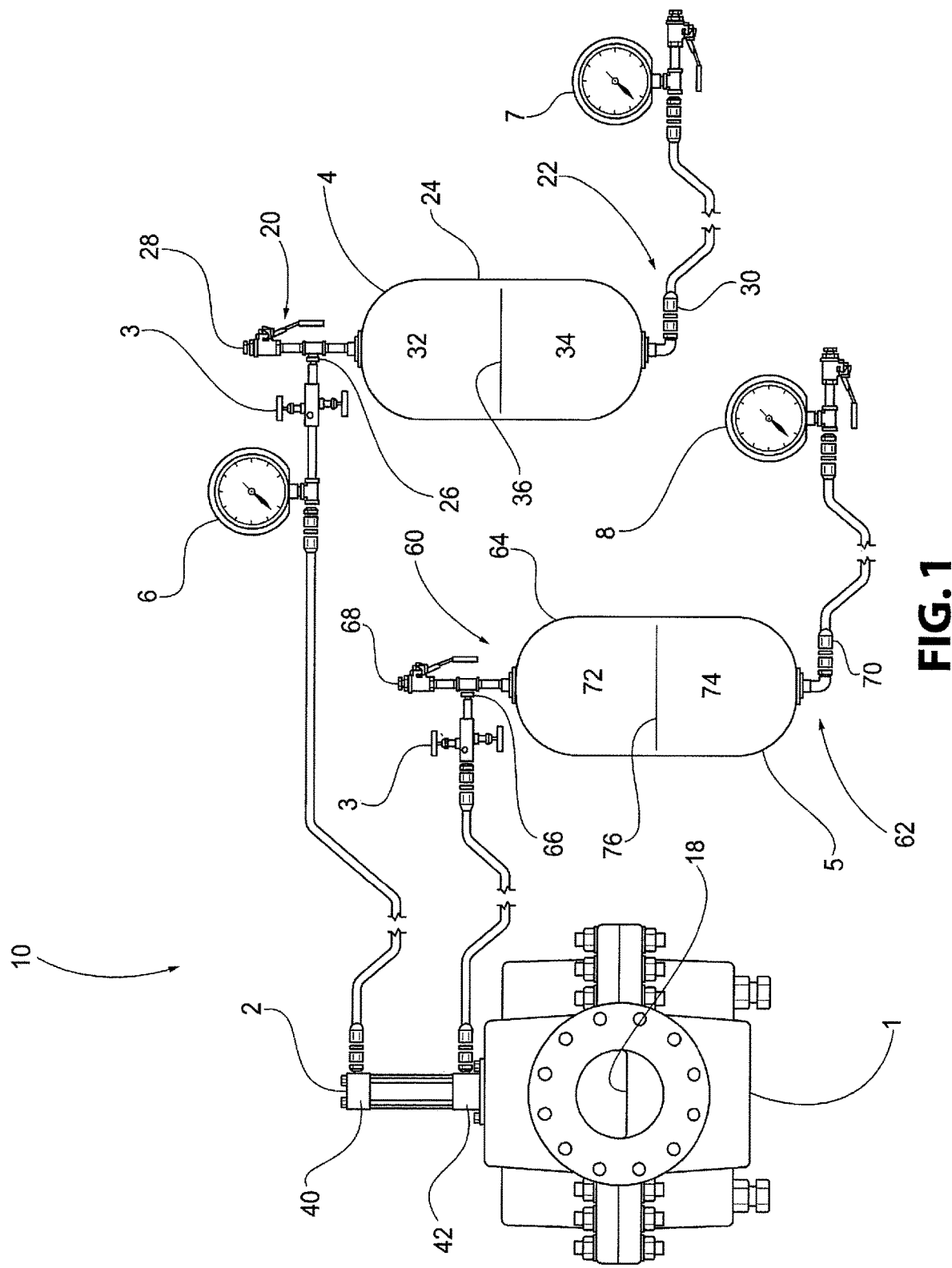
FIG. 1 is a perspective view of a valve system for maintaining pressure and headloss in pipelines according to the present invention.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Further, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, in some embodiments, the present invention is directed to a valve system for maintaining pressure and headloss in pipelines. Referring to FIG. 1, the valve system 10 includes a valve 1, a hydraulic cylinder 2, and a first accumulator 4 in fluid communication with the hydraulic cylinder 2.

The valve 1 used with the present invention can be selected from any valve that can be used to control the flow of water through a pipeline. Non-limiting examples of suitable valves include pinch valves, globe valves, plug valves, and combinations thereof. In some embodiments, as shown in FIG. 1, the valve 1 is a pinch valve. In general, a pinch valve uses a flexible or elastomeric tube that acts as a closure member to control the flow of water. By pinching or constricting the tube, the amount of flow is reduced and in some instances completely stopped.

Figure 2:
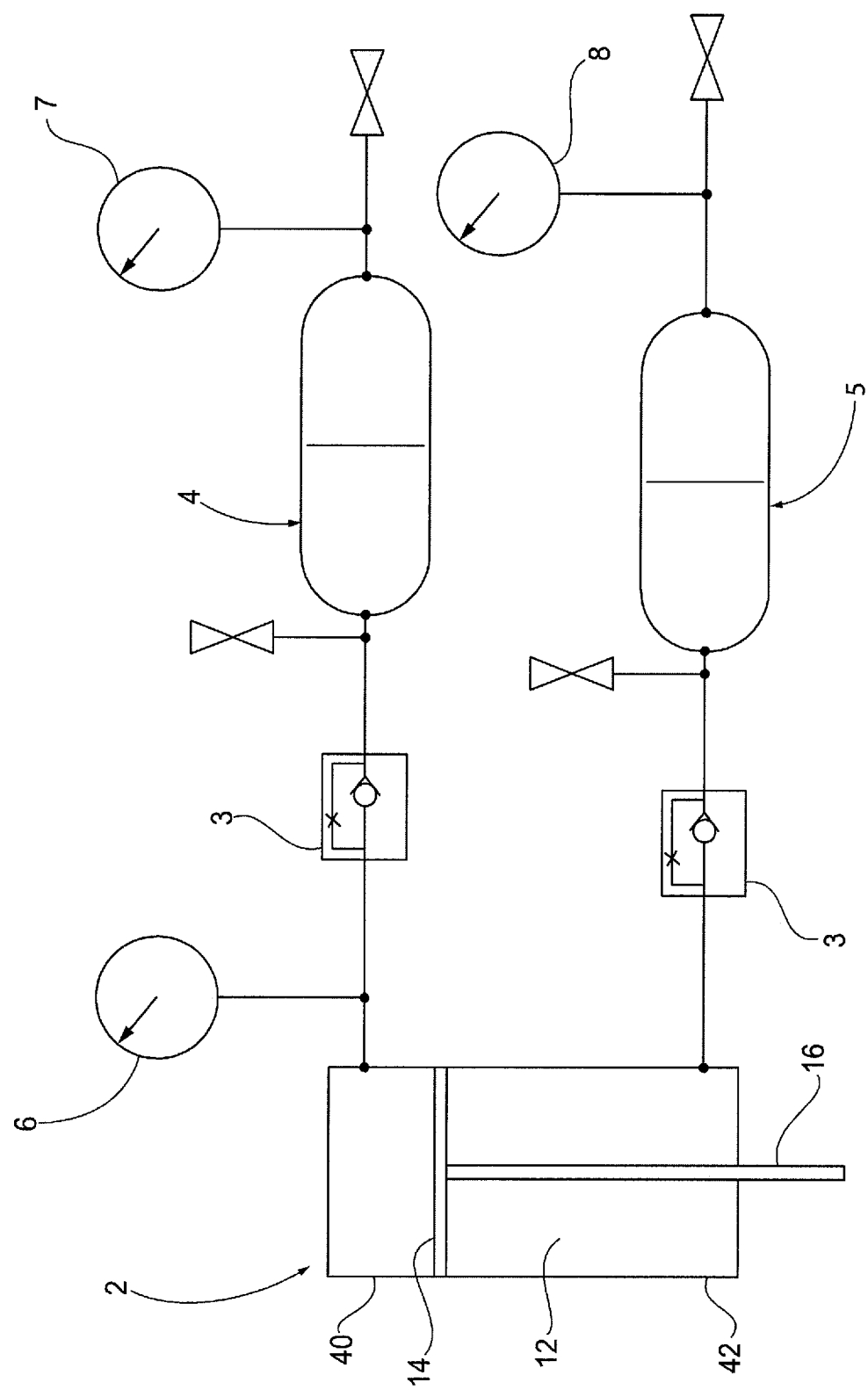
FIG. 2 is a flow diagram of the valve system of FIG. 1.

Referring to FIG. 1, the hydraulic cylinder 2 is attached to the valve 1 such as to a top portion of the valve 1. It is appreciated that the hydraulic cylinder 2 can be attached to other portions of the valve 1 such as a bottom portion of the valve 1. Referring to FIG. 2, the hydraulic cylinder 2 comprises a cylindrical barrel 12 with a piston 14 and a piston rod 16 that is operated by movement of the piston 14. In accordance with the present invention, the hydraulic cylinder 2 is attached to the valve 1 so that the piston rod 16 is associated with a closure member 18 of the valve 1. In some embodiments, the closure member 18 is an elastomeric closure member. As used herein, the term "elastomeric" refers to a material which can be elongated from its relaxed length using an applied force and which will recover upon release of the applied force. Non-limiting examples of a suitable elastomeric materials include rubber materials. It is appreciated that elastomeric closure members 18 can be used in various types of valves 1. For example, the valve system 10 of the present invention can comprise a pinch valve that includes an elastomeric closure member 18.

Further, the piston rod 16 can be attached directly or indirectly to the closure member 18 of the valve 1. For example, when the valve 1 is a pinch valve, the piston rod 16 is attached directly to the elastomeric closure member 18 of the valve 1. The association of the hydraulic cylinder 2 with the closure member 18 of the valve 1 allows the piston rod 16 to close and open the valve 1 through movement of the piston 14.

As previously described, the first accumulator 4 is in fluid communication with the hydraulic cylinder 2. Referring to FIG. 1, the first accumulator 4 can include a first side 20, a second side 22, and a hollow body 24 positioned between the first side 20 and the second side 22. As further shown in FIG. 1, the first side 20 of the first accumulator 4 includes a fluid outlet 26 that is in fluid communication with a first side 40 of the hydraulic cylinder 2 where the piston 14 is located. The fluid outlet 26 can be connected to the first side 40 of the hydraulic cylinder 2 with a tube, hose, or the like. The first side 20 of the first accumulator 4 also includes a fluid inlet 28 that allows a liquid to enter a portion of the hollow body 24. The fluid inlet 28 is connected to a fluid source that supplies the fluid to the hollow body 24 of the first accumulator 4. A non-limiting example of a suitable fluid that can be distributed into and out of the first accumulator 4 is a hydraulic oil.

Further, the second side 22 of the first accumulator 4 includes a gas inlet 30 that allows a gas to enter a portion of the hollow body 24. The gas inlet 30 is connected to a gas source that supplies the gas to the hollow body 24 of the first accumulator 4. Non-limiting examples of suitable gases that can be distributed into the first accumulator 4 include air and nitrogen.

Moreover, the body 24 of the first accumulator 4 includes two chambers: (i) a fluid chamber 32 that receives fluid from the fluid source; and (ii) a gas chamber 34 that receives gas from the gas source. It is appreciated that the fluid chamber 32 is positioned in the hollow body 24 at the first side 20 of the first accumulator 4, and the gas chamber 34 is positioned in the hollow body 24 at the second side 22 of the first accumulator 4. The fluid chamber 32 and gas chamber 34 are separated by an impermeable, flexible separating member 36. The flexible separating member 36 can be made of various materials that exhibit flexibility including, but not limited to, rubber materials. A non-limiting example of a suitable flexible separating member 36 is a flexible diaphragm.

In accordance with the present invention, the flexible separating member 36 can flex into a portion of the fluid chamber 32 that receives fluid from the fluid source, or into a portion of the gas chamber 34 that receives gas from the gas source. As such, when the gas contained in the gas chamber 34 creates a pressure that is greater than the pressure in the fluid chamber 32, the flexible separating member 36 will flex into a portion of the fluid chamber 32 causing fluid to exit the fluid outlet 26 toward the hydraulic cylinder 2. As fluids enters the hydraulic cylinder 2, the piston rod 16 moves downwards closing the closure member 18 of the valve 1. Thus, the valve 1 of the present invention is closed when the pressure in the gas chamber 34 is greater than the pressure in the fluid chamber 32 such that fluid moves into the hydraulic cylinder 2 to cause the piston rod 16 to move downwards.

In some embodiments, as shown in FIG. 1, the valve system 10 also includes a second accumulator 5. The second accumulator 5 can be the same as the first accumulator 4 previously described. For example, and as shown in FIG. 1, the second accumulator 5 can include a first side 60, a second side 62, and a hollow body 64 positioned between the first side 60 and the second side 62. As further shown in FIG. 1, the first side 60 of the second accumulator 5 includes a fluid outlet 66 that is in fluid communication with a second side 42 of the hydraulic cylinder 2 where the piston 14 is located. The fluid outlet 66 is connected to the second side 42 of the hydraulic cylinder 2 with a tube, hose, or the like. The first side 60 of the second accumulator 5 also includes a fluid inlet 68 that allows a liquid to enter a portion of the hollow body 64. The fluid inlet 68 is connected to a fluid source that supplies the fluid to the hollow body 64 of the second accumulator 5.

Further, the second side 62 of the second accumulator 5 includes a gas inlet 70 that allows a gas to enter a portion of the hollow body 64. The gas inlet 70 is connected to a gas source that supplies the gas to the hollow body 64 of the accumulator 5. Similar to the first accumulator 4, the body 64 of the second accumulator 5 includes two chambers: (i) a fluid chamber 72 that receives fluid from the fluid source; and (ii) a gas chamber 74 that receives gas from the gas source. The fluid chamber 72 is positioned in the hollow body 64 at the first side 60 of the second accumulator 5, and the gas chamber 74 is positioned in the hollow body 64 at the second side 62 of the second accumulator 5. The fluid chamber 72 and gas chamber 74 are separated by an impermeable, flexible separating member 76. The flexible separating member 76 operates in a similar manner as the flexible separating member 36 of the first accumulator 4. As such, the flexible separating member 76 of the second accumulator 5 is configured to flex into a portion of the fluid chamber 72 causing fluid to exit the fluid outlet 26 toward the hydraulic cylinder 2 when the gas contained in the gas chamber 74 creates a pressure that is greater than the pressure in the fluid chamber 72.

As indicated, the second accumulator 5 is connected to the second side 42 of the hydraulic cylinder 2 and causes fluid to exit the fluid outlet 66 toward the hydraulic cylinder 2 when the gas contained in the gas chamber 74 creates a pressure that is greater than the pressure in the fluid chamber 72. It was found that the second accumulator 5 can help provide better control of the piston rod 16 and increase the closing speed of the valve 1.

The valve system 10 can also include various other components as well. For example, and as shown in FIG. 1, the valve system 10 of the present invention can also include adjustable flow controls 3. The flow controls 3 are configured to control the flow of fluid to and from the accumulators 4 and 5. As further shown in FIG. 1, the valve system 10 can further include fluid gauges 6, and/or gas gauges 7 and 8 that indicate the fluid and gas pressure.

During operation of the valve system 10, fluid from the fluid source is distributed into the fluid chamber 32 of the accumulator 4 and gas from the gas source is distributed into the gas chamber 34 of the accumulator 4. The pressure from the gas chamber 34 will force the separating member 36 to flex into a portion of the fluid chamber 32 causing an increase in fluid pressure such that the fluid exits the fluid outlet 26 of the accumulator 4. The fluid will then flow to the hydraulic cylinder 2 to move the piston rod 16 downwards, which in turn closes the closure member 18 of the valve 1. Similarly, when the pressure within the pipeline causes the closure member 18 of the valve 1 to open, the piston rod 16 will move upwards and displace the hydraulic fluid and gas in the accumulator 4. Thus, positive pressure forces the valve 1 open and negative pressure forces the valve 1 to close. It is appreciated that the second accumulator 5 can function in a similar manner to increase the closing speed of the valve 1. That is, the valve system 10 can comprise a second accumulator 5 that provides an additional negative pressure force to increase the closing speed of the valve 1. FIG. 2 is a flow diagram illustrating the flow of gas and hydraulic fluid through the accumulators 4 and 5 and hydraulic cylinder 2.

It was found that the valve system 10 of the present invention can maintain the pressure and headloss in a pipeline with the valve 1 operating mechanism being isolated from the internal fluid of the pipeline. Further, because the valve system 10 reacts directly to the opening and closing forces of the hydraulic cylinder 2 and not to the internal valve pressure, the valve system 10 can be used with pipelines that transport dirty fluids, corrosive fluids, slurries, and clean fluids without any of the drawbacks associated with other known systems. The operation of the valve system 10 also does not require an external energy source.

Moreover, the valve system 10 of the present invention also provides a virtually linear opening profile. For instance, when the desired opening pressure is reached, the closure member 18 of the valve 1 moves from fully closed to fully open with virtually no increase in force. The increase in force is, therefore, easily controlled to be in the range of 1% or less to 5%. By maintaining this linearity, the valve 1 can fully open with virtually no increase in pumping energy.

The valve system 10 of the present invention can also be adapted to generate a controlled back pressure in a control valve 1 to minimize cavitation. Particularly, the valve system 10 is capable of producing high back pressures during low pressure discharge from the control valve 1, and limited back pressure during high flow rates. Existing orifice devices have little impact at low flow rates and a heavy impact at high flow rates.

Whereas particular embodiments of this invention have been described above for purposes of illustration, it will be evident to those skilled in the art that numerous variations of the details of the present invention may be made without departing from the invention as defined in the appended claims.

The invention claimed is:

1. A valve system comprising:
a valve;
a hydraulic cylinder attached to at least a portion of the valve; and
at least a first accumulator in fluid communication with the hydraulic cylinder, said first accumulator comprising: (i) a first end comprising a fluid inlet and a fluid outlet; (ii) a second end comprising a gas inlet; and (iii) a body positioned between the first end and the second end and which comprises a fluid chamber and a gas chamber separated by a flexible separating member, wherein the hydraulic cylinder is configured to close the valve in response to pressure provided by fluid distributed from the first accumulator, the valve system further comprising a second accumulator in fluid communication with the hydraulic cylinder.

2. The valve system according to claim 1, wherein the hydraulic cylinder comprises a barrel having a piston and a piston rod, and wherein the piston rod is associated with a closure member of the valve.

3. The valve system according to claim 2, wherein the piston rod of the hydraulic cylinder is attached to the closure member of the valve.

4. The valve system according to claim 1, wherein the second accumulator comprises: (i) a first end comprising a fluid inlet and a fluid outlet; (ii) a second end comprising a gas inlet; and (iii) a body positioned between the first end and the second end and which comprises a fluid chamber and a gas chamber separated by a flexible separating member, wherein the second accumulator is configured to increase a closing speed of the valve.

5. The valve system according to claim 4, wherein the second accumulator is in fluid communication with a first end of the hydraulic cylinder where a piston is located and the second accumulator is in fluid communication with a second end of the hydraulic cylinder that is opposite the first end of the hydraulic cylinder.

6. The valve system according to claim 1, further comprising a fluid source attached to the fluid inlet of the first accumulator.

7. The valve system according to claim 1, further comprising a gas source attached to the gas inlet of the first accumulator.

8. The valve system according to claim 1, further comprising at least one of an adjustable flow control for controlling flow of fluid to and from the accumulator, a fluid gauge, and a gas gauge.

9. The valve system according to claim 1, wherein the valve is a pinch valve.

10. A method for maintaining pressure and headloss in a pipeline comprising:
distributing fluid into a fluid chamber of a first accumulator;
distributing gas into a gas chamber of the first accumulator that is separated from the fluid chamber by a flexible separating member;
transporting the fluid from the fluid chamber of the first accumulator to a hydraulic cylinder that is attached to at least a portion of a valve of the pipeline; and
closing the valve by movement of the hydraulic cylinder in a first direction in response to a pressure provided by the fluid from the fluid chamber of the first accumulator, the method further comprising a second accumulator in fluid communication with the hydraulic cylinder.

11. The method according to claim 10, further comprising opening the valve by movement of the hydraulic cylinder in a second direction opposite the first direction in response to an opening of the valve in the pipeline from pipeline fluid.

12. The method according to claim 10, wherein the hydraulic cylinder comprises a barrel having a piston and a piston rod, and wherein the piston rod is associated with a closure member of the valve.

13. The method according to claim 12, wherein the piston rod of the hydraulic cylinder is attached to the closure member of the valve.

14. The method according to claim 10, wherein the second accumulator comprises: (i) a first end comprising a fluid inlet and a fluid outlet; (ii) a second end comprising a gas inlet; and (iii) a body positioned between the first end and the second end and which comprises a fluid chamber and a gas chamber separated by a flexible separating member, wherein the second accumulator is configured to increase a closing speed of the valve.

15. The method according to claim 10, wherein the first accumulator is in fluid communication with a first end of the hydraulic cylinder where a piston is located and the second accumulator is in fluid communication with a second end of the hydraulic cylinder that is opposite the first end of the hydraulic cylinder.

16. The method according to claim 15, further comprising distributing fluid into the fluid chamber of the second accumulator, distributing gas into the gas chamber of the second accumulator, and transporting the fluid from the fluid chamber of the second accumulator to the hydraulic cylinder.

* * * * *